United States Patent
Rogerson et al.

(10) Patent No.: US 8,276,070 B2
(45) Date of Patent: Sep. 25, 2012

(54) MECHANISM TO DYNAMICALLY HOST MULTIPLE RENDERERS BASED ON SYSTEM CAPABILITIES

(75) Inventors: Dale Rogerson, Seattle, WA (US); Andrew Reddish, Seattle, WA (US); Sridhar Chandrashekar, Redmond, WA (US); Justin McRoberts, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1560 days.

(21) Appl. No.: 11/119,177

(22) Filed: Apr. 29, 2005

(65) Prior Publication Data

US 2006/0248460 A1    Nov. 2, 2006

(51) Int. Cl.
*G06F 3/00* (2006.01)
*G06F 17/00* (2006.01)
(52) U.S. Cl. ......... 715/705; 715/708; 715/714; 715/249
(58) Field of Classification Search .................. 715/523, 715/705, 708, 714, 234–249; 719/328
See application file for complete search history.

(56) References Cited

U.S. PATENT DOCUMENTS

| | | | |
|---|---|---|---|
| 7,203,737 B2 * | 4/2007 | Starbuck et al. | 709/219 |
| 7,380,250 B2 * | 5/2008 | Schechter et al. | 719/328 |
| 2003/0084096 A1 * | 5/2003 | Starbuck et al. | 709/203 |
| 2004/0155901 A1 * | 8/2004 | McKee et al. | 345/747 |

OTHER PUBLICATIONS

Functinal specification entitled "NUI help platform infrastructure" May 1, 2003 pp. 1-17.*
Microsoft article 310791, "Description of the software restriction policies in Windows XP", 2002.*
Matthew Ellison, "Introduction to Windows "Longhorn" Help", Oct. 2004 49 pages.*
Shane McRoberts, "Programming Windows Help" Oct. 2003, 6 pages.*
"Development of Windows Vista", 17 pages.*
Matthew Ellison, "Microsoft "Longhorn" Help Highlights" Feb. 2004, 6 pages.*
Microsoft help file "Description of the software restriction policies in windows xp", 2002, 2 pages.*

* cited by examiner

*Primary Examiner* — Haoshian Shih
(74) *Attorney, Agent, or Firm* — Joseph R. Kelly; Westman, Champlin & Kelly, P.A.

(57) ABSTRACT

A system for presentation of help files on a computer with an operating system and a display is provided. Presentation-independent information associated with an application is stored on the computer. A help application is adapted to access the presentation-independent information based on user interactions and automatically to select between available rendering applications at runtime for displaying the presentation-independent information on the display.

15 Claims, 4 Drawing Sheets

… (1)

MECHANISM TO DYNAMICALLY HOST MULTIPLE RENDERERS BASED ON SYSTEM CAPABILITIES

BACKGROUND OF THE INVENTION

The present invention relates to a user interface for software applications, and more particularly, to systems and methods for rendering and displaying help information within the user interface based on available rendering applications.

Generally, when a software developer creates a software application, the developer writes a help file associated with the software application to assist the user. Unfortunately, unless the developer includes rendering software with the software application for rendering the help file, the help file content may not display as desired or expected.

Conventionally, help content is coded in a presentation dependent manner. Even in cases where developers have created authoring and distribution systems that target different published formats (such as print, CD, HyperText Markup Language, and the like), the authoring and distribution systems are still presentation dependent. The term "presentation dependent" refers generally to the formatting of the content. For example, if an author specifies the way in which something is to be displayed (such as bold, italics, blue, and the like) even if the way the formatting is eventually implemented varies across applications, the authored content is not presentation independent. Unfortunately, depending on the end user's system on which the content is to be displayed, a selected formatting type may or may not be supported, and consequently the content may be displayed without formatting and/or in a way that is difficult for the user to read. Unfortunately, the author cannot account for all possible variations in the capabilities of end user systems.

Therefore, there is an ongoing need in software application design for systems and methods for delivering and displaying presentation independent content. Embodiments of the present invention provide solutions to these problems and other advantages over the prior art.

SUMMARY OF THE INVENTION

A system for presentation of help files on a computer with an operating system and a display is provided. Presentation-independent information associated with an application is stored on the computer. A help application is adapted to access the presentation-independent information based on user interactions and automatically to select between available rendering applications at runtime for displaying the presentation-independent information on the display.

In one embodiment, a method for rendering presentation-independent content on a host system is provided. A rendering application is selected at runtime from a plurality of available rendering applications of the host system based on content of a presentation-independent file. The presentation-independent file is converted into a presentation dependent file having a format corresponding to the selected rendering application for display in the selected rendering application.

In another embodiment, a system for dynamically hosting multiple renderers has a plurality of rendering applications, one or more files, and a help application. The plurality of rendering applications on a host system is adapted for displaying content on the host system. The one or more files have presentation-independent content. A help application is adapted to select one of the plurality of rendering applications at runtime based on content of the one or more files and to display the one or more files in the selected rendering application.

DETAILED DESCRIPTION OF ILLUSTRATIVE EMBODIMENTS

Figure 1:
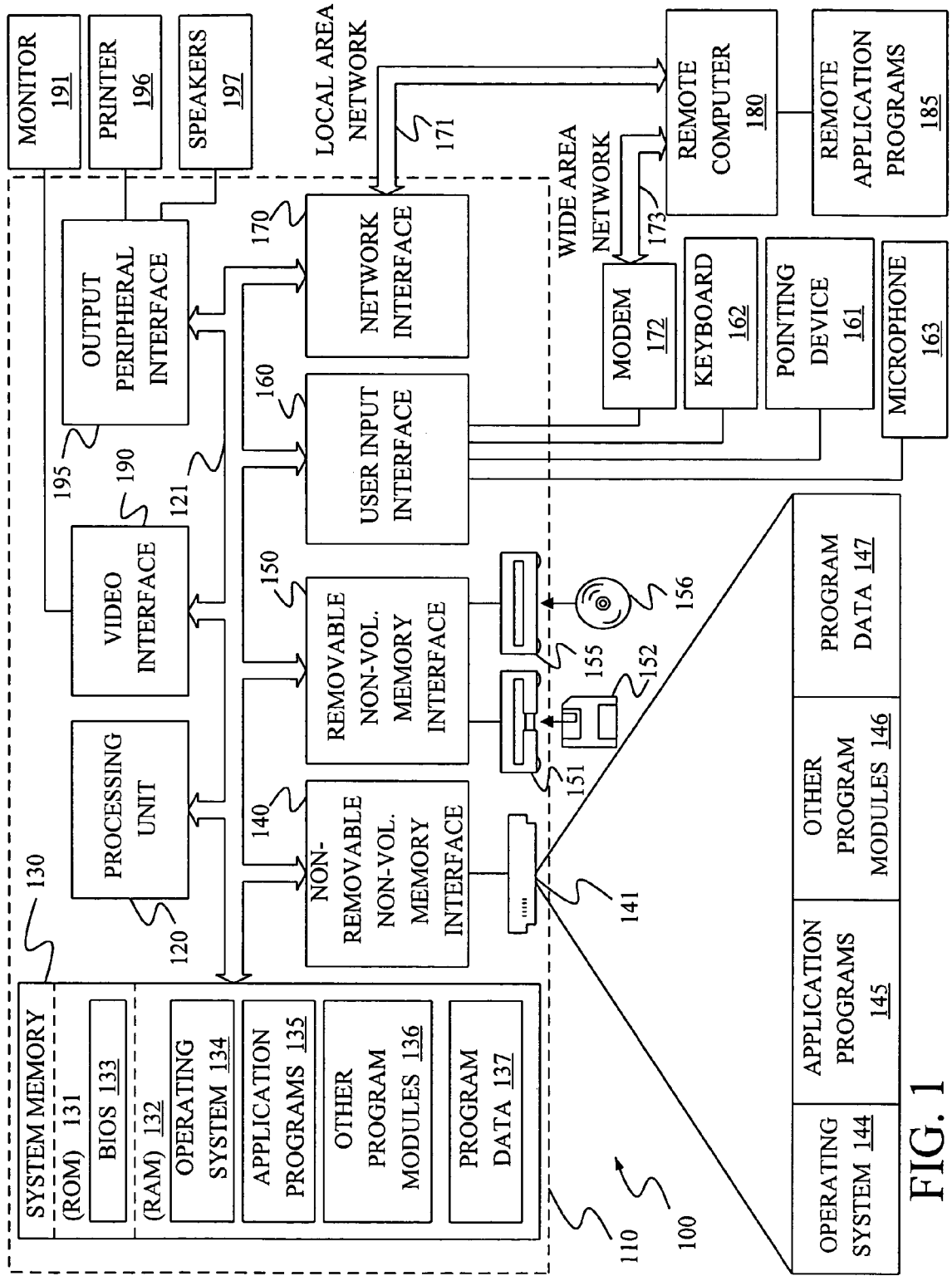
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

The present invention describes systems and methods for presentation independent authoring of content. More particularly, the present invention identifies the meaning of various elements within the help content and allows the visual display to be defined or determined later. For example, instead of formatting a word as Bolded and Italicized within the help content, the word can be tagged or otherwise assigned or identified as a function name, for example. Depending on the available rendering applications on a particular computer, a selected rendering application can then use the tag or assignment to define the visuals for that particular application.

Figure 2:
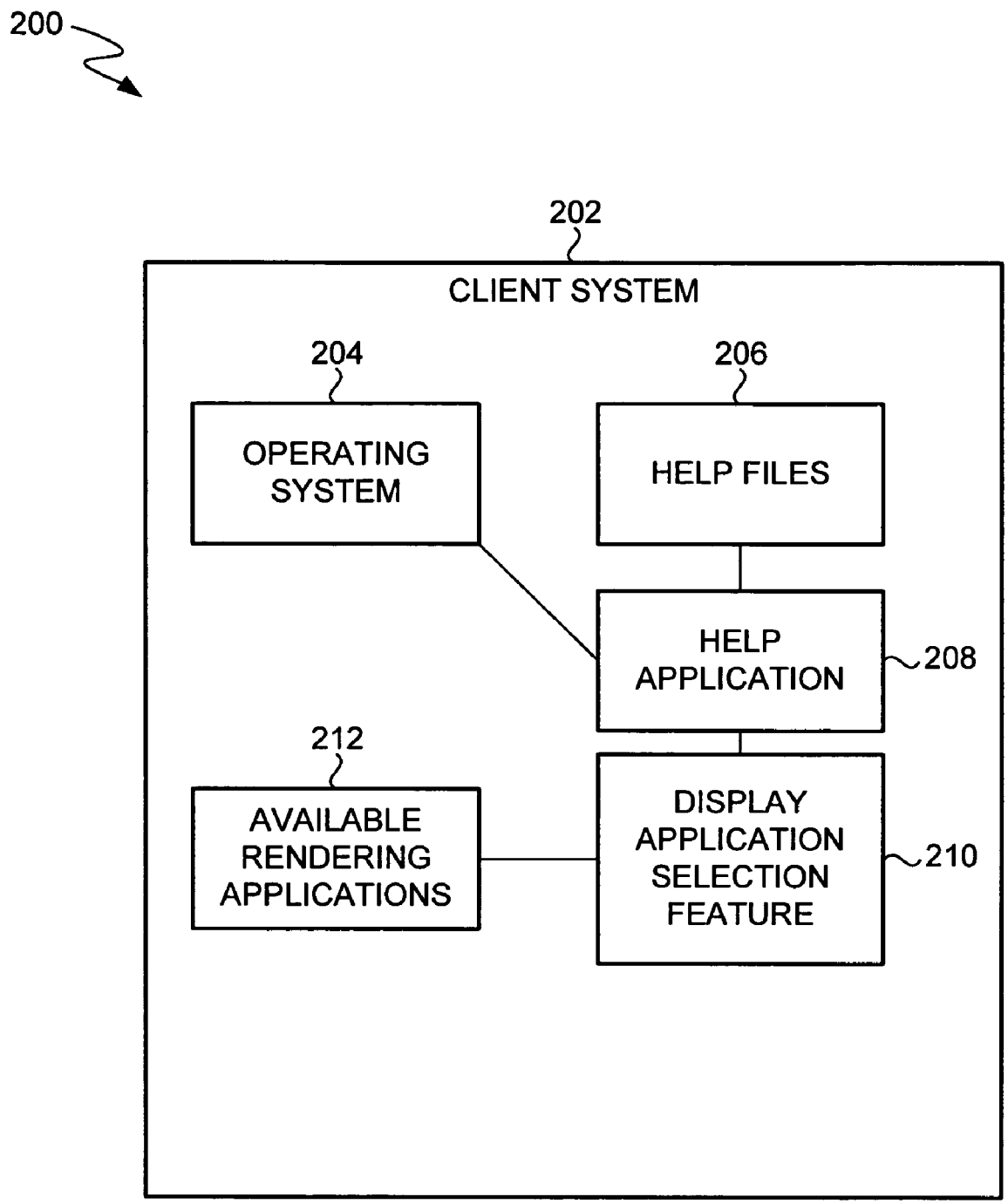
FIG. 2 is a simplified block diagram of a system for runtime selection of a renderer according to an embodiment of the present invention.

FIG. 2 is a simplified block diagram of a system 200 for runtime selection of a rendering application for presentation of the help file. The system 200 includes a client system 202 with an operating system 204, help file 206, a help application 208, a display application selection feature 210 and available rendering applications 212. In general, the help application 208 is adapted to select among available rendering applications 212 using the display application selection feature 210 at runtime for displaying the help files 206.

The help application 208, based on interaction with a user of the client system 202, is adapted to query the operating system 204 to acquire a list of the available rendering applications 212, to select between rendering applications in the list using the selection feature 210, and to render the help files 206 in a selected rendering application of the available rendering applications 212. This allows the help application 208 to select a rendering application at runtime based on a best available rendering application. A best available rendering application 212 may vary over time, particularly as a user installs additional software on the client system 202. Thus, the help application 208 is adapted to take advantage of available rendering applications 212 to render the help files 206 in a best available format for display.

In one embodiment, an author of the help content can specify a preferred rendering application within the help file. The help application 208 can be influenced by the author's preference to select the desired rendering application 212.

Figure 3:
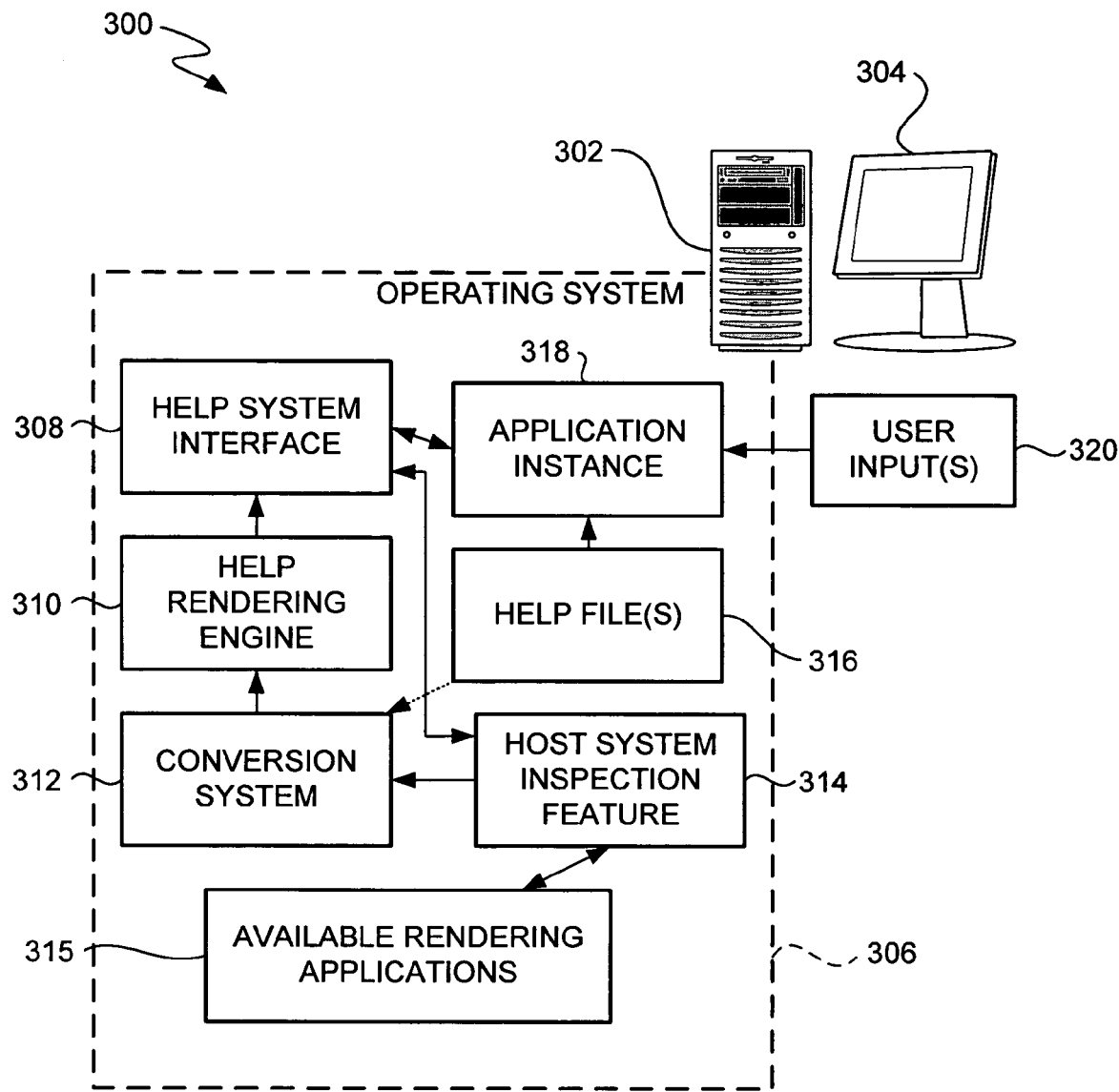
FIG. 3 is a simplified block diagram of a system for dynamically hosting multiple renderers according to an embodiment of the present invention.

FIG. 3 is a simplified block diagram of a system 300 for dynamically hosting multiple rendering applications according to an embodiment of the present invention. The system 300 includes a host system 302 with a display 304 and an operating system 306. The computer 302 also contains a help system interface 308, a help rendering engine 310, a conversion system 312, a host system inspection feature 314, available rendering applications 315, and an application instance 318 with associated help files 316. An operator or user interacts with a user interface of the application instance 318. User inputs 320 to the user interface of the application instance 318 can include selection of a help feature of the application instance 318.

Upon selection of the help feature of the application instance 318, the host system inspection feature 314 inspects the host system 302 for available rendering applications 315. The host inspection system 314 assembles a list of available rendering applications 315. The help rendering engine 310 attempts to instantiate the most desirable rendering application 315, based on user preference and availability of conversion between the presentation independent help file 316 and the rendering applications 315. For example, the help file author may specify a preference to always render in Dynamic HyperText Markup Language (DHTML). However, if a transform (conversion) for a specific extensible Markup Language (XML) topic does not allow or support the transformation to DHTML, the conversion system 312 falls back to another format, such as text.

An example of a known basic rendering application (or "renderer") supported on almost all systems is an Internet browser control, which can be used to display HyperText Markup Language (HTML) formats, DHTML formats and plain text formats (such as ASCII text without formatting), for example. If a browser control was a preferred renderer, the rendering engine 310 can fall back to a text-based system, for example, and render the content as static, plain text.

The conversion system 312 is adapted to convert the help files 316 from a preferred format to a format of the best available rendering application 315. For example, if the help files 316 were written in the DHTML format but no DHTML control is available on the client system 302, the conversion system 312 can convert the help files 316 from DHTML format to text format for display in as plain text in a rendering application 315 that supports plain text. If a direct conversion from the format of the help files 316 to the format of a selected rendering application is not available, the conversion system 312 can convert the help files 316 to an intermediate format and then to the desired format.

Figure 4:
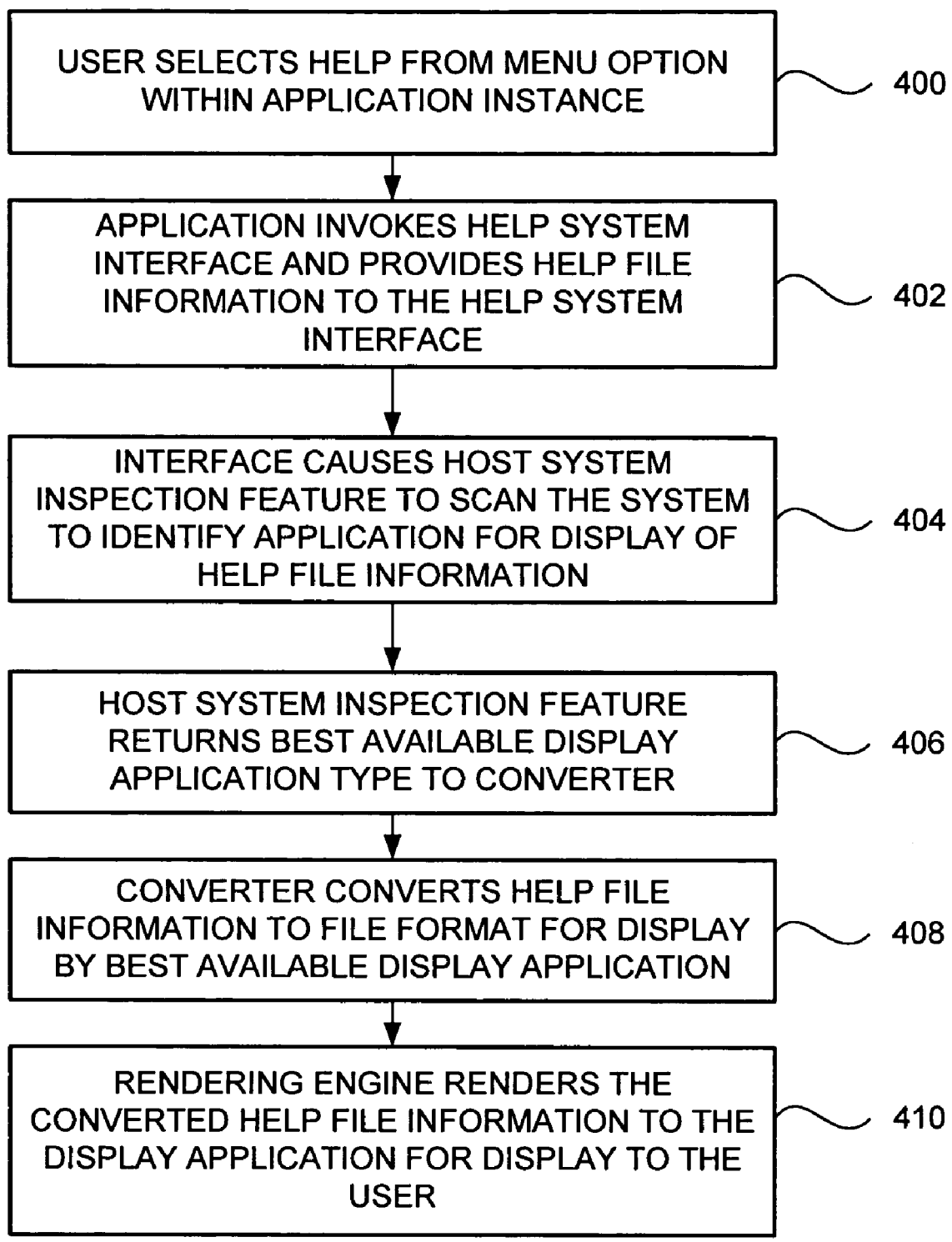
FIG. 4 is a simplified flow diagram of a process for dynamically hosting multiple renderers according to an embodiment of the present invention.

FIG. 4 is a simplified flow diagram of a process for dynamically hosting multiple renderers according to an embodiment of the present invention. A user selects "help" from menu options with an application instance (step 400). The application invokes a help system interface and provides help file information to the help system interface (step 402). The help system interface causes the host system inspection feature to scan the client system to identify applications for display of the help file information (step 404). The host system inspection feature returns a list of the best available display application types to a converter (step 406). The converter converts the help file information, if necessary, to the file format for display by the best available display application (step 408). Finally, the rendering engine renders the converted help file information to the display application for display to the user (step 410). In general, the best available rendering application is an application that supports a greatest percentage of the coding and/or features of the help file or that is specified by the user, by the content, or by the author of the content. Alternatively, if a system policy prohibits a user on the system from using or having a particular rendering application (or renderer), a fall back rendering application will be used.

Though the present invention has been described with respect to help files, it should be understood that the invention is applicable to any type of file for display. In particular, the operating system can be adapted to select between available rendering engines and to display the content in the best available engine based on the content of the file.

Though the system has been described with a client system inspection feature, it should be understood that the help application of the present invention can simply query the operating system for available display applications. One example where this functionality is particularly useful is when the help system may be used with different operating systems. A particular rendering application may only work on a computer running a particular operating system. For example, one rendering application may only work on a computer with a Microsoft® Windows® 2000 operating system, and not on a machine with an embedded Microsoft® Windows® XP installation, which may not have all the capabilities of a full-fledged Windows® installation.

In this manner, the help application of the present invention adapts the content of the help files to the state of the machine. Moreover, the display format can take advantage of display features of an available rendering application to provide a best possible experience for the user.

Although the present invention has been described with reference to particular embodiments, workers skilled in the art will recognize that changes may be made in form and detail without departing from the spirit and scope of the invention.

What is claimed is:

1. A system for presentation of help files on a computer with an operating system and a display device, the system comprising:

presentation-independent help information associated with an application on the computer that indicates how to use the application;

a user input mechanism receiving a user help input selecting display of a help feature in the help information;

a host inspection feature searching the computer for available rendering applications and building a list of available rendering applications in response to each user help input received during run-time;

a help application accessing the presentation-independent help information based on each user help input, assessing the list of available rendering applications, and automatically selecting a rendering application, at runtime, based on content of the presentation-independent help information and capabilities of the available rendering applications, uncovered by the run-time assessment, to display the presentation-independent help information, the selected rendering application displaying a larger portion of features in the presentation-independent help information on the display device than other rendering applications in the list of available rendering applications;

a help rendering engine rendering a display of the presentation-independent help information using the selected rendering application; and a computer processor being a functional component of the system and activated by the help application facilitating selecting between available rendering applications.

2. The system of claim 1 further comprising:
a conversion feature converting the presentation-independent help information to a presentation dependent format corresponding to a format of the selected rendering application.

3. The system of claim 1 wherein the presentation-independent content is converted to an intermediate format and then to a format corresponding to the format of the selected rendering application.

4. A system for dynamically hosting multiple renderers comprises:
a plurality of rendering applications on a host system that display content on the host system;
one or more help files comprising presentation-independent help content;
a help application receiving a user help input requesting display of a help feature in the help content and, in response to the user help input, automatically selecting one of the plurality of rendering applications at runtime based on content of the one or more help files and displaying the one or more help files in the selected rendering application;
wherein the automatic selection is performed by a display application selection feature, invoked by the help application in response to each user help input received, to identify the plurality of rendering applications on the host system at run-time and select from among the identified rendering applications also based on which of the rendering applications renders a largest portion of features in the help content, based on policy settings of the system, and based on an indicated preference of an author of the content; and a computer processor, being a functional component of the system, activated by the help application to facilitate selecting and displaying.

5. The system of claim 4 further comprising:
a conversion system converting the one or more files to a format of the selected one of the plurality of rendering applications.

6. The system of claim 4 further comprising:
a host inspection feature searching the host system for available rendering applications and to build a list of available rendering applications.

7. The system of claim 4 further comprising:
a help rendering engine rendering the presentation-independent content in the selected one of the plurality of rendering applications.

8. The system of claim 4 further wherein the presentation-independent content is converted to an intermediate format and then to a format corresponding to the format of the selected rendering application.

9. The system of claim 4 further comprising:
a help system interface displaying the content to a user.

10. The system of claim 1 wherein the host inspection feature identifies a best available rendering application.

11. The system of claim 10 wherein the help application selects the best available rendering application identified by the host inspection feature as the selected rendering application.

12. The system of claim 1 wherein the user input mechanism is provided in an instance of a first application.

13. The system of claim 1 wherein the user input mechanism comprises a menu option.

14. The system of claim 13 wherein the first application invokes a help system interface in response to the user help input.

15. The system of claim 13 wherein the help system interface causes the host inspection feature to search the computer for the available rendering applications.

* * * * *